US005673889A

United States Patent [19]

DeValcourt

[11] Patent Number: 5,673,889

[45] Date of Patent: Oct. 7, 1997

[54] WIND SURFING EQUIPMENT HOLDER

[76] Inventor: Ricky D. DeValcourt, 5520 Cruzat Way, Pensaiola, Fla. 32507

[21] Appl. No.: 535,471

[22] Filed: Sep. 28, 1995

[51] Int. Cl.[6] .................... A47B 96/06

[52] U.S. Cl. .................... 248/229.17; 248/230.8; 248/503; 224/319

[58] Field of Search .................... 248/229.2, 229.17, 248/230.8, 503, 505, 534; 211/70.8; 224/309, 319, 324

[56] References Cited

U.S. PATENT DOCUMENTS

| | | | |
|---|---|---|---|
| 3,591,063 | 7/1971 | Pearce | 224/55 |
| 4,630,990 | 12/1986 | Whiting | 224/324 X |
| 4,717,055 | 1/1988 | San Juan | 224/42.45 |
| 4,793,535 | 12/1988 | Johnson | 224/329 |
| 5,005,509 | 4/1991 | Williams | 224/309 X |
| 5,014,955 | 5/1991 | Thompson | 248/309.1 |
| 5,346,165 | 9/1994 | Frean et al. | 248/505 X |
| 5,358,162 | 10/1994 | Hill | 224/319 X |
| 5,395,018 | 3/1995 | Studdiford | 248/229.2 X |
| 5,435,472 | 7/1995 | Allen et al. | 224/324 X |
| 5,465,890 | 11/1995 | Allen | 224/309 X |

FOREIGN PATENT DOCUMENTS

| | | | |
|---|---|---|---|
| 2679182 | 1/1993 | France | 224/319 |

*Primary Examiner*—Leslie A. Braun
*Assistant Examiner*—Gwendolyn W. Baxter
*Attorney, Agent, or Firm*—Peter Loffler

[57] ABSTRACT

A wind surfing equipment holder is disclosed. The device comprises a pair of equipment holders each comprising a hollow, non-scuff bottomed base and a traversly disposed optionally telescoping stanchion. The top of the stanchion has a generally U-shaped saddle, with a slot on each end, located thereon. The wind surfing board is attached to a vehicle in usual fashion. Each equipment holder is placed on top of the board in spaced apart fashion and strapped in place. The boom is clamped to one stanchion and circumferentially fitted around the other stanchion and height adjusted into place. The mast is received within the saddle and the sail is positioned onto one side of the stanchions. A strap is fitted through the hollow base, around the sail and mast, through each slot of the saddle and tightened in place.

17 Claims, 6 Drawing Sheets

20
20
1
18
26
26
10
24
12
22
24
14
16
22

44
20
20
1'
18
44
26
12'
24
46
22
10'
46
42
16'
14'
22

100
20
20
26
1
18
26
10
108
24
104
106
14
22
24
12
102
16

100
20
20
26
18
1
108
10
24
106
106
14
22
12
102
16
24

48
1
10
12
22
24
14
22
16

WIND SURFING EQUIPMENT HOLDER

BACKGROUND OF THE INVENTION

1. Field of the Invention

The present invention relates to wind surfers and more particularly for holders of wind surfing equipment capable of being mounted onto vehicles 2. Background of the Prior Art Generally speaking, the sport of wind surfing consists of mounting a mast, boom, and sail onto a surfboard. The user uses the wind instead of a breaking wave with which to pry the wind surfing craft.

Wind surfing equipment, including, board, mast, sail, and boom can cost anywhere from hundreds of dollars to several thousand dollars. This equipment is also relatively bulky and difficult to transport. There are several known devices to transport a standard surfboard, such as U.S. Pat. No. 4,793,535 issued to Johnson and U.S. Pat. No. 5,014,955 issued to Thompson. While these devices are relatively effective in transporting a surfboard by car or other vehicle they do not provide for the transportation of the remainder of wind surfing equipment.

Most wind surfers will affix their wind surfing board to the roof of their vehicle by some device or method and will simply strap or tie the remainder of the wind surfing equipment to the surfboard. By doing so, the wind surfer risks bending or otherwise damaging the boom or mast and thereby rendering the wind surfing equipment useless.

There is a need in the art for a device for vehicle transportation of wind surfing equipment. Such a device should work in conjunction with an apparatus that hold wind surfing boards to the roof of a car or truck. Such a device should assure that the mast and boom of the wind surfer does don get bent or otherwise suffer damage.

SUMMARY OF THE INVENTION

The present invention meets the above-identified need in the art for transportation of wind surfing equipment. The device comprises a pair of equipment holders each comprising a base having a hollow portion with a resilient non-scuff bottom and an optionally telescoping stanchion. On top of the stanchion is a generally U-shaped saddle.

The wind surfing board is attached to the vehicle in ordinary fashion. Two equipment holders are placed on top of the board in spaced apart fashion with each strapped in placed onto the board. The boom is clamped to one of the stanchions with the opposing end of the boom circumferentially fitted around the second stanchion. The boom is then height adjusted so as to hold the end of the boom tightly in place around the second stanchion. The mast is received on top of each saddle. The sail is rolled up and placed onto one side of the stanchions. Optionally, the sail can be placed into a sail base and the case placed onto one side of the stanchions.

A second set of straps is fitted through the hollow portion and lashed around the mast and fitted through slots located on either side of the saddle. A FASTEX buckle is used to tighten the strap and thereby hold the mast and sail in place.

Stack adjustment modules are disclosed in order to secure more than one set of masts and booms with the device. Also disclosed is a second method of strapping the sail and mast in place. This second embodiment comprises a hollow portion that has a flat top with a series of slots on either side of the stanchion. The second securement strap is permanently fitted through the saddle slots (which have strap rollers located thereon). The ends of this strap are fitted with hooks that are hooked into place within one of the slots one each side of the stanchion. The selection of the slot is determined by the size of the mast and the sail.

DETAILED DESCRIPTION OF THE PREFERRED EMBODIMENT

Figure 1:
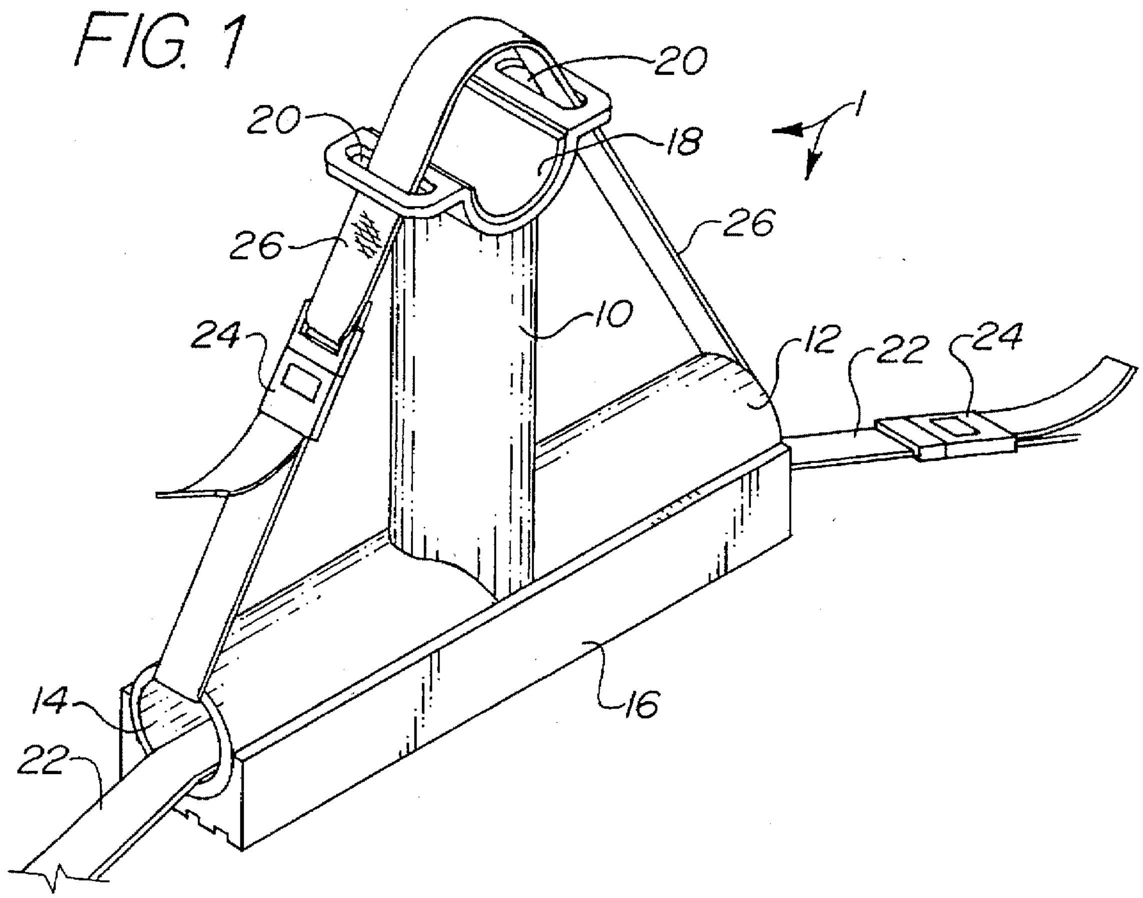
FIG. 1 is a perspective view of the wind surfing equipment holder of the present invention.

As seen in FIGS. 1, and 3–6, the wind surfing holder 1 of the present invention comprises an upright stanchion 10 with an integral traversly disposed base 12. The base 12 consists of a hollow portion 14 of any particular geometric shape and a resilient non-scuff portion 16.

The top of the stanchion 10 is provided with a saddle 18. The saddle 18, which is a U-shaped member having a pair of slots 20 on either side, receives the mast 100 of the wind surfer.

In order to utilize the wind surfing holder of the present invention, two wind surfer holders 1 are placed on top of the wind surfing board 102 in spaced apart fashion. A strap 22 is wrapped around the wind surfing board 102 and is passed through the hollow portion 14 of each wind surfing holder 1. A Fastex thermoplastic buckle 24 or other buckling means can be used to tightly secure this strap 22 in place. The Fastex buckle 24 has integral tension adjustment means. It is expressly recognized that devices other than Fastex buckles can be used to tighten and hold the straps 22 in place (such as cooperating hook and loop material).

Once the two wind surfing holders 1 are strapped in place on top of the wind surfing board 102, the clamp 104 of the boom 106 is clamped onto one of the stanchions 10 while the other end of the boom 106 is circumferentially fitted over the other stanchion 10. The boom 106 is height adjusted so that it rests snugly in place around the two stanchions 10. The sail 108 of the wind surfer is rolled and optionally placed into a sail holder. The sail 108, or optional holder, is placed on top of the base of the wind surfer holder 1 on one side of the stanchions 10. The mast 100 is fitted onto each of the saddles 18.

Thereafter, a second set of straps 26 is fitted through the hollow portion 14, around the positioned sail 108 (or sail holder) and around the positioned mast 100. A second set of Fastex thermoplastic buckles 24 is used to tighten the straps 26 and hold the sail 108 and mast 100 in place. Again, it is recognized that devices other than Fastex buckles can be used to tighten and hold the second set of straps 26 in place. The wind surfing mast 100, board 102, boom 104 and sail 108 are now securely held together as a unit and can be positioned on the roof of a vehicle in usual fashion for transport.

Figure 9:
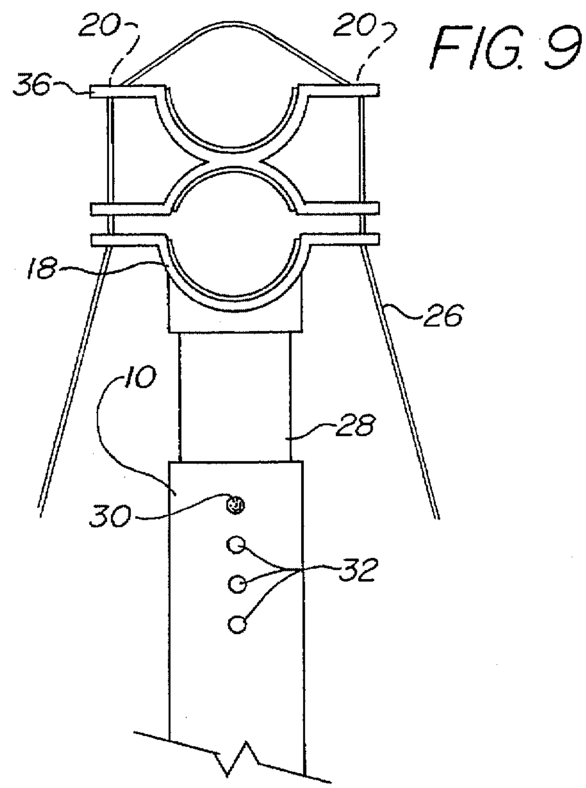
FIG. 9 is a front elevation view of the stacking modules positioned on top of the stanchion.
Figure 7:
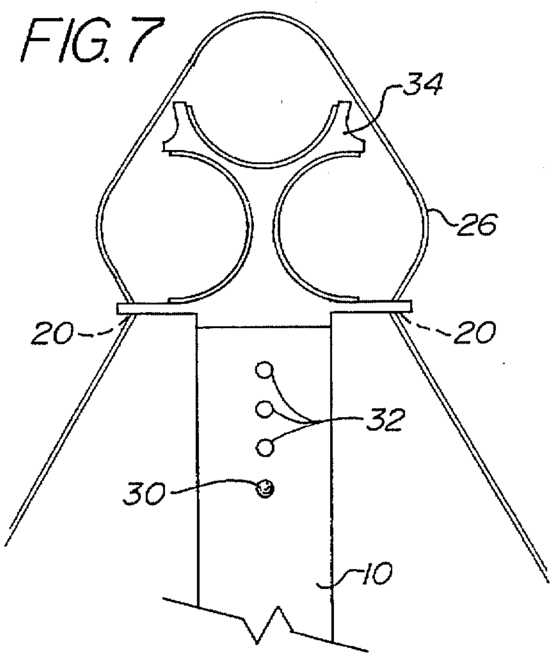
FIG. 7 is a front elevation view of a multi-saddle top attached to a stanchion.
Figure 8:
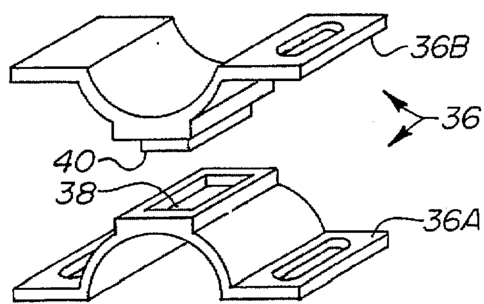
FIG. 8 is a perspective view of a mating pair of stacking modules.
Figure 10:
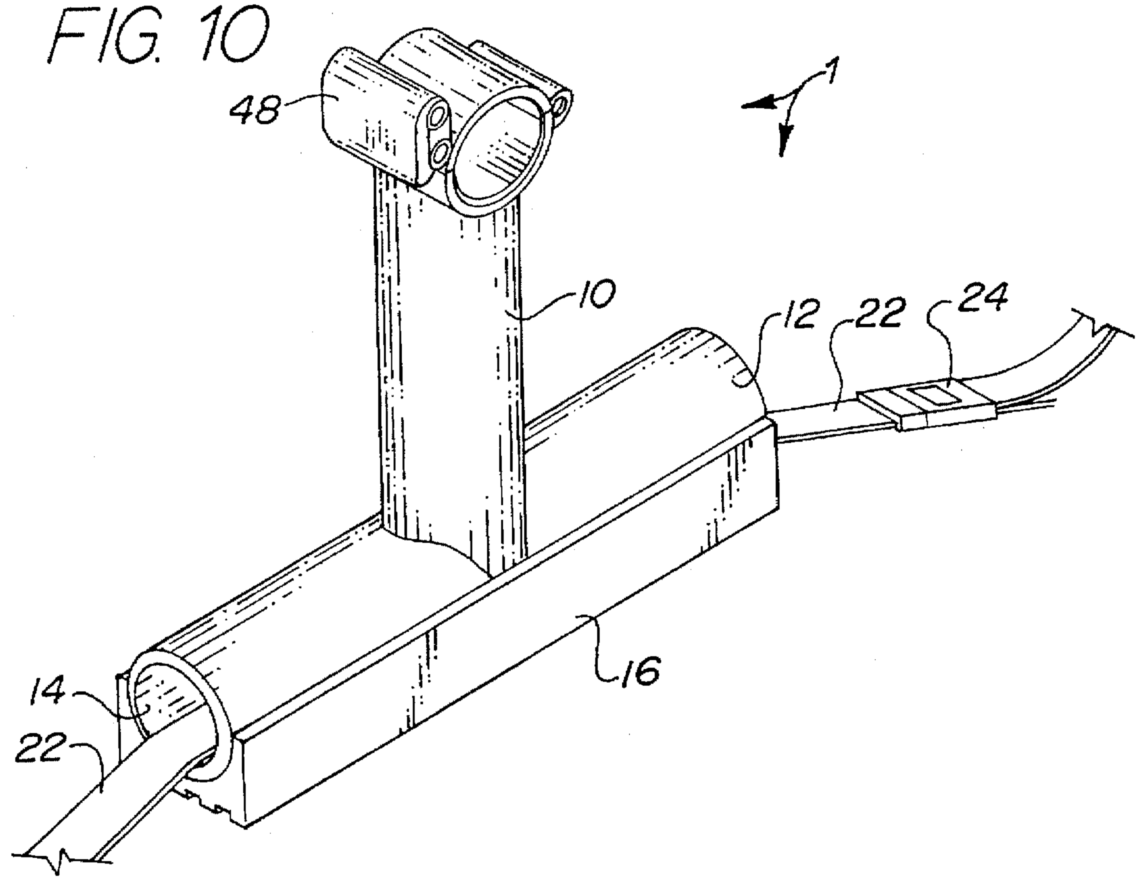

As seen in FIGS. 7–9 the device can be configured so as to hold several sets of wind surfing equipment. The stanchion 10 can be made extensible by giving it a telescoping member 28. A spring-loaded button 30 with cooperating height adjustment holes 32 provide the upwardly extensible telescoping feature.

In order to hold more than one mast 100, the top of the stanchion 10 can be fitted with a multi-saddle top 34. Each side of the multi-saddle top 34 would have the usual slots 20 for receiving the second set of tie down straps 26.

Alternately, stacking modules 36 can be utilized to hold multiple masts 100. The stacking module 36 has the familiar U-shaped portion and the side slots 20. Once the first mast 100 is in place on the stanchion saddle 18, a first stacking module 36 is placed on top of the mast 100. The base of this first stacking module 36*a* had a depression 38 at its base forming a female receptacle for a locating tab. A second stacking module 36*b* is placed on top of the first module 36*a* in inverted fashion. The second stacking module 36*b* has a locating tab 40 on its base which fits into the female receptacle 38 of the first stacking module 36*a*. The second mast 100 is received into the saddle portion 18 of the second stacking module 36*b*.

Figure 2:
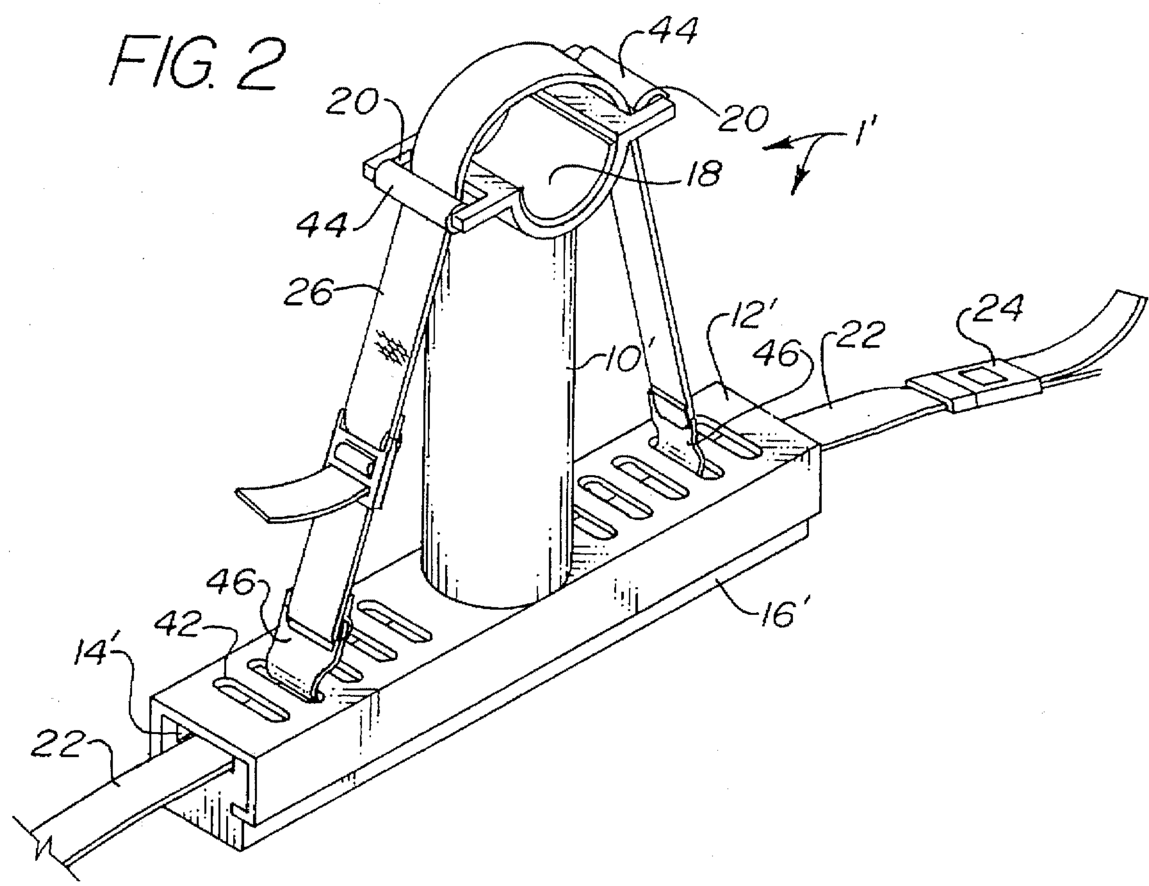
FIG. 2 is a perspective view of an alternate embodiment of the wind surfing equipment holder of the present invention.
Figure 4:
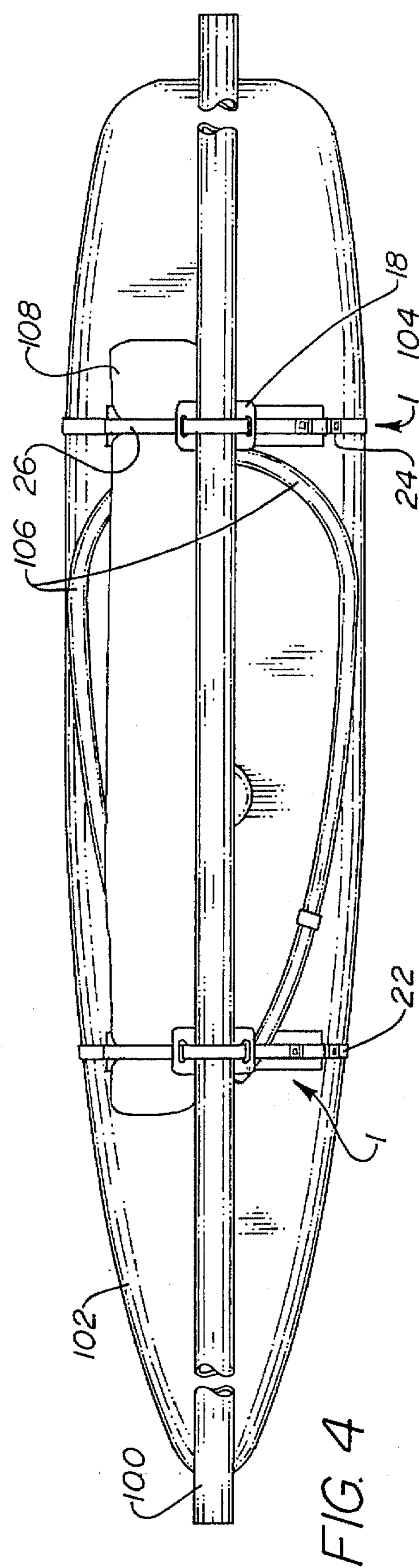
FIG. 4 is a top plan view of FIG. 3.
Figure 3:
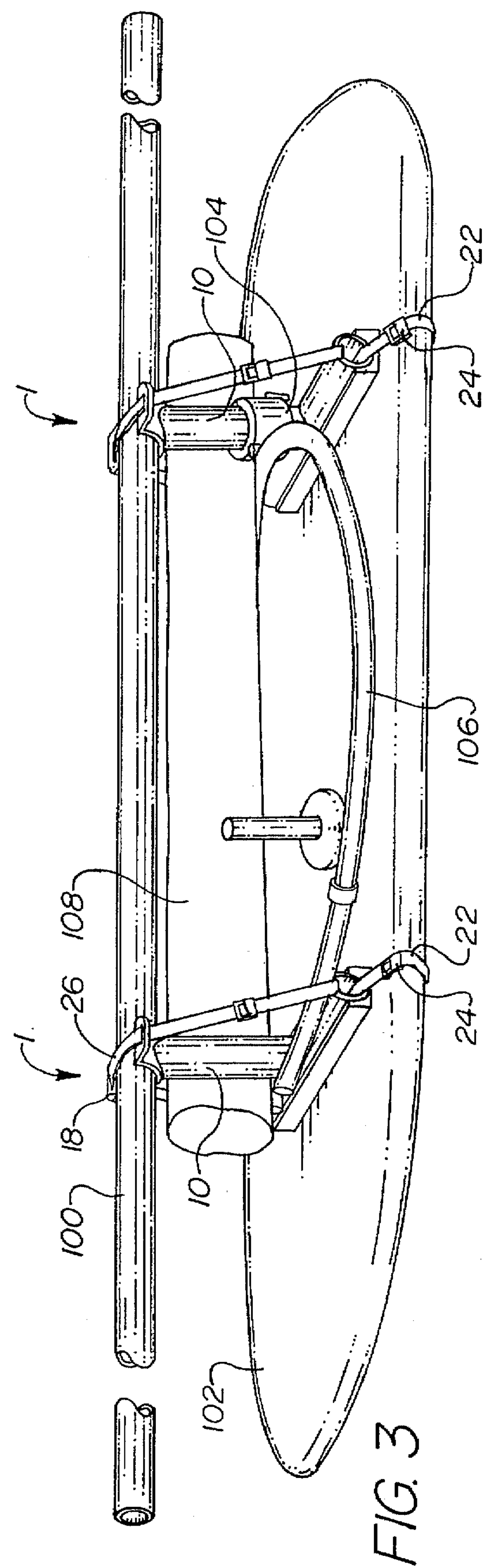
FIG. 3 is a perspective view of the wind surfing equipment holder fully installed on top of a wind surfing board.
Figure 5:
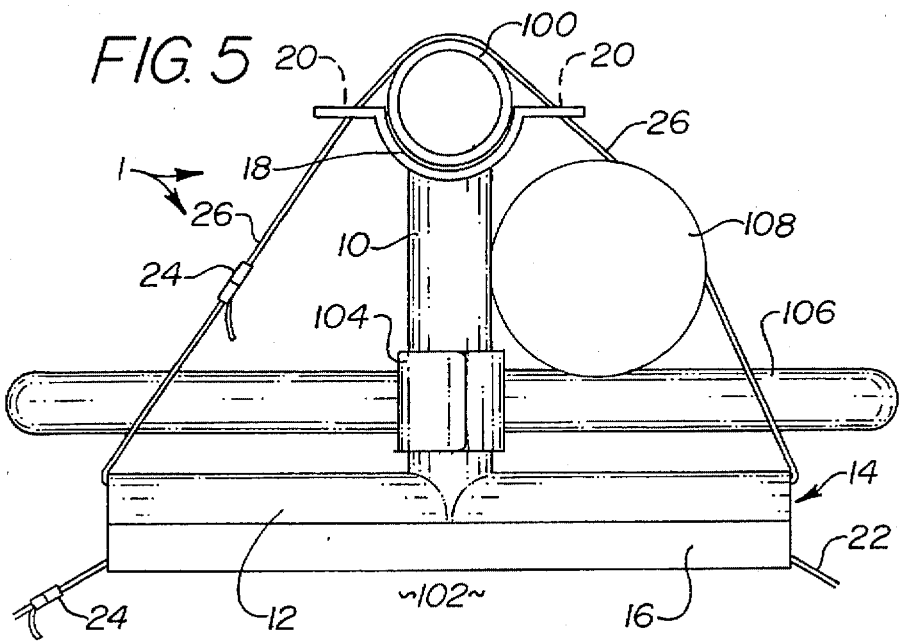
FIG. 5 is a front elevation view of the clamp side of a boom attached to the wind surfing equipment holder.
Figure 6:
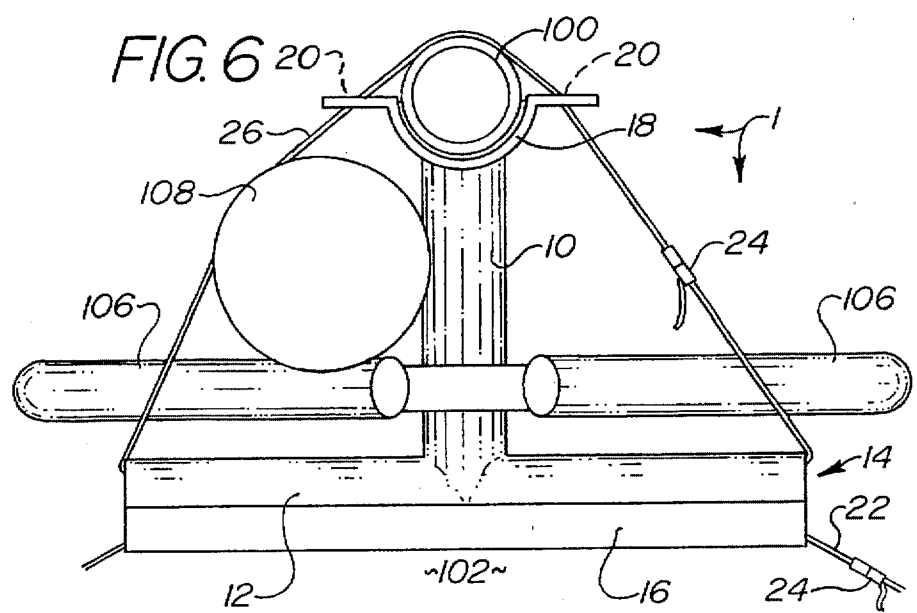
FIG. 6 is a back elevation view of the non-clamp side of a boom attached to the wind surfing equipment holder.

As seen in FIG. 2, a second embodiment of the wind surfer holder 1' is disclosed. As seen, the hollow portion 14' of this second embodiment has a flat surface with a series of retention slots 42 on each side of the stanchion 10'. Each slot 20 on the saddle 18 has a roller 44. The second securement strap 26 is permanently fitted through each slot 20 of the saddle 18. Each end of the second securement strap 26 is fitted with a hook 46. Once the mast 100 and the sail 108 are properly positioned, each hook 46 on the end of the second securement strap 26 is fitted into one of the slots 42 on the base 12', depending on the tightness requirement of the strap 26.

Alternatively, the saddle 18 can be in the form of a clamp for securely clamping the mast 100 to the top of the stanchion 10.

While the invention has been particularly shown and described with reference to embodiments thereof, it will be recognized by those skilled in the art that various changes in form and detail may be made without departing from the spirit and scope of the invention.

I claim:

1. A wind surfing equipment holder comprising:

a) a base having a hollow portion;

b) a telescoping stanchion, extending upwardly from the top of the base in perpendicular relation;

c) a holding means, affixed to the top of the stanchion, for receiving and holding a wind surfing mast;

d) a first strap, passing through the hollow portion, for securing the base to a wind surfing board; and e) a second strap, passing through the hollow portion, for securing the mast within the holding means.

2. The device as in claim 1 to further include a first tension means for tensioning the first strap.

3. The device as in claim 1 to further include a second tension means for tensioning the second strap.

4. The device as in claim 1 wherein the bottom of the base has a non-scuff portion.

5. The device as in claim 1 wherein the holding means comprises a saddle having a U-shaped central portion, for receiving the mast, and two slotted end portions for passing the second strap therethrough.

6. The device as in claim 1 wherein the holding means comprises a plurality of saddles each having a U-shaped central portion, for receiving the mast, and two slotted end portions for passing the second strap therethrough.

7. The device as in claim 1 wherein the holding means comprises:

a) a first saddle having a U-shaped central portion, for receiving the mast, and a first pair of slotted end portions for passing the second strap therethrough;

b) a second saddle, having a U-shaped central portion, and a second pair of slotted end portions for passing the second strap therethrough, positionable over top the mast, c) a third saddle, having a U-shaped central portion, for receiving a second wind surfing mast, and a third pair of slotted end portions for passing the second strap therethrough, positioned over top the second saddle.

8. A wind surfing equipment holder comprising:

a) a base having a hollow portion and a generally flat top surface;

b) a stanchion, extending upwardly from the top of the base in perpendicular relation;

c) a first set of slotted apertures, located on the base on one side of the stanchion and a second set of slotted apertures, located on the base on the opposing side thereon;

d) a holding means, affixed to the top of the stanchion, for receiving and holding a wind surfing mast e) a first strap, passing through the hollow portion, for securing the base to a wind surfing board; and f) a second strap for securing the mast within the holding means g) a first hook attached to one end of the second strap and a second hook attached to the opposing end of the second strap; and wherein the mast is receivable within the holding means, the strap is positionable over top the mast and the first hook is received within the first set of slotted apertures and the second hook is received within the second set of apertures.

9. The device as in claim 8 to further include a first tension means for tensioning the first strap.

10. The device as in claim 8 to further include a second tension means for tensioning the second strap.

11. The device as in claim 8 wherein the bottom of the base has a non-scuff portion.

12. The device as in claim 8 wherein the stanchion is telescoping.

13. The device as in claim 8 wherein the holding means comprises a saddle having a U-shaped central portion, for receiving the mast, and two slotted end portions for passing the second strap therethrough.

14. The device as in claim 8 wherein the holding means comprises a plurality of saddles each having a U-shaped central portion, for receiving the mast, and two slotted end portions for passing the second strap therethrough.

15. The device as in claim 8 wherein the holding means comprises:

a) a first saddle having a U-shaped central portion, for receiving the mast, and a first pair of slotted end portions for passing the second strap therethrough;

b) a second saddle, having a U-shaped central portion, and a second pair of slotted end portions for passing the second strap therethrough, positioned over top the mast, c) a third saddle, having a U-shaped central portion, for receiving a second wind surfing mast, and a third pair of slotted end portions for passing the second strap therethrough, positioned over top the second saddle.

16. A wind surfing equipment holder comprising:

a) a base having a hollow portion;

b) a stanchion, extending upwardly from the top of the base in perpendicular relation;

c) a first strap, passing through the hollow portion, for securing the base to a wind surfing board;

d) a second strap, passing through the hollow portion, for securing a mast within the holding means; and e) at least one saddle having a U-shaped central portion, affixed to the top of the stanchion, for receiving and holding a wind surfing mast, and two slotted end portions for passing the second strap therethrough.

17. The device as in claim 16 wherein the stanchion is telescoping.

* * * * *